(12) United States Patent
Roush

(10) Patent No.: US 12,043,187 B2
(45) Date of Patent: Jul. 23, 2024

(54) TEMPORARY, MAGNETIC LICENSE PLATE HOLDER DEVICE

(71) Applicant: Tyler S. Roush, Massillon, OH (US)

(72) Inventor: Tyler S. Roush, Massillon, OH (US)

( * ) Notice: Subject to any disclaimer, the term of this patent is extended or adjusted under 35 U.S.C. 154(b) by 132 days.

(21) Appl. No.: 17/869,270

(22) Filed: Jul. 20, 2022

(65) Prior Publication Data

US 2024/0025356 A1    Jan. 25, 2024

(51) Int. Cl.
*B60R 13/10*      (2006.01)
*B60R 11/00*      (2006.01)

(52) U.S. Cl.
CPC ............ B60R 13/105 (2013.01); B60R 11/00 (2013.01); *B60R 2011/0057* (2013.01); *B60R 2011/0066* (2013.01)

(58) Field of Classification Search
CPC ................... B60R 13/105; B60R 11/00; B60R 2011/0057; B60R 2011/0066
See application file for complete search history.

(56) References Cited

U.S. PATENT DOCUMENTS

| | | | |
|---|---|---|---|
| 4,813,167 A | 3/1989 | Means | |
| 7,877,908 B2 | 2/2011 | Collins | |
| 9,440,597 B1* | 9/2016 | Broadwell | B60R 13/105 |
| 10,001,039 B2* | 6/2018 | Shin | F01M 11/0408 |
| 10,836,331 B1* | 11/2020 | Lee | G09F 7/04 |
| 2007/0049930 A1* | 3/2007 | Hearn | A61B 17/66 |
| | | | 606/56 |
| 2011/0140474 A1* | 6/2011 | Smith | B62D 27/06 |
| | | | 296/35.1 |
| 2015/0078861 A1* | 3/2015 | Heinz | G09F 7/18 |
| | | | 411/368 |
| 2016/0068117 A1* | 3/2016 | Huelke | F16B 1/00 |
| | | | 24/303 |
| 2022/0111806 A1 | 4/2022 | Marks | |
| 2022/0274540 A1* | 9/2022 | Tortorella, Jr. | B60R 13/105 |

* cited by examiner

*Primary Examiner* — Gary C Hoge
(74) *Attorney, Agent, or Firm* — Hudak, Shunk & Farine Co. LPA

(57) ABSTRACT

A license plate holder device for temporarily securing a plate, for example a vehicle dealer license plate, to a vehicle, in particular to existing license plate hardware such as bolts or screws having heads. The license plate holder device temporary attachment mechanism is two-fold, providing both a magnetic connection to the existing license plate hardware and a physical contact with the existing hardware that supports against a shearing force substantially perpendicular to the longitudinal axis of the hardware.

20 Claims, 5 Drawing Sheets

TEMPORARY, MAGNETIC LICENSE PLATE HOLDER DEVICE

FIELD OF THE INVENTION

The present invention relates to a license plate holder device for temporarily securing a plate, for example a vehicle dealer license plate, to a vehicle, in particular to existing license plate hardware such as bolts or screws having heads. The license plate holder device temporary attachment mechanism is two-fold, providing both a magnetic connection to the existing license plate hardware and a physical contact with the existing hardware that supports against a shearing force substantially perpendicular to the longitudinal axis of the hardware.

BACKGROUND OF THE INVENTION

The laws of many states require vehicles to display a license plate when driven on a public roadway. Business such as dealerships have large inventories of vehicles. When a potential purchaser test drives a vehicle, a license plate such as a dealer plate or special use license plate needs to be installed onto the vehicle to comply with the law.

Many different means have been used to display a temporary license plate on a vehicle.

One method of displaying a temporary license plate is to place the plate inside the vehicle against the rear window. However, such practice is not legal in many jurisdictions.

Another method of affixing a temporary license plate to a vehicle includes placing the temporary plate in a plate holder having a magnet connected thereto, such as a bar magnet. However, many of today's vehicles do not have magnetic surfaces at the rear of the vehicle where the temporary plate must be affixed. Also, the magnetic holder may mar the finish of the vehicle. Furthermore, there may be a problem of properly illuminating the license plate.

Still another method is to affix the temporary license plate to a frame having a flexible flap that is adapted to be inserted into a trunk opening of the vehicle, wherein the trunk lid is closed on the flap. The trunk area may be damaged due to close tolerances provided by the vehicle manufacturer. Still further, the temporary plate is not secure and can mar the finish of the vehicle. Also, the temporary plate is not properly illuminated as required by law in low light conditions.

Yet another method involves the process of unbolting a current license plate frame and/or license plate from the vehicle and installing the temporary plate with the existing hardware. This process is time consuming and repetitive.

Still other systems are disclosed in the following literature:

U.S. Publication 2022/0111806 relates to a magnetic license plate holder system. Embodiments are directed to a magnetic license plate holder system including a license plate which includes a rear side and an opposing front side. The magnetic license plate holder system also includes a magnetic attachment system which includes: a rear attachment system configured to be positioned between a license plate holder and the rear side of the license plate, while facing the rear side of the license plate; and a front attachment system configured to be facing the front side of the license plate. The rear attachment system is configured to be releasably attached to the front attachment system. Each of the rear attachment system and the front attachment system includes either a magnet or a non-magnetic ferric material. At least one of the rear attachment system or the front attachment system comprises a magnet.

U.S. Pat. No. 7,877,908 relates to a vehicle plate retention frame and removably affixed cover plate. The retention frame may have at least one first part of a two-part separable fastener disposed thereon. The cover plate has at least one second part of the two-part separable fastener associated therewith so that the cover plate may be removably affixed to the retention frame.

U.S. Pat. No. 4,813,167 relates to a method for fastening a license plate or a cover plate for a license plate to a vehicle and apparatus therefor which includes use of a plurality of two-part separable fasteners. A first part of each fastener is secured to, or actually comprises, the head of each of the bolts which are provided to hold the license plate to the vehicle. The second part of each fastener is secured to a back side of the plate to be secured to the vehicle and positioned to mate with its respective first part in a friction-fit relation. When a cover plate for a license plate is so mounted, it is placed in an overlying relation with respect to the license plate.

For the avoidance of doubt, the devices and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In view of the above, the industry and art still needs a license plate holder device for temporarily securing a plate to a vehicle in a facile manner, while being legal and easily removed from the vehicle, for example after a test drive.

SUMMARY OF THE INVENTION

In view of the above, the problems of the prior art and others are solved by the present invention which provides a temporary, magnetic license plate holder device which temporarily secures a plate, such as a vehicle dealer license plate, to a vehicle through existing license plate hardware present on the vehicle, such as bolts or screws without having to adjust the latter.

The device has a two-part temporary securing mechanism including i) a magnetic connection to the existing license plate holder hardware as well as ii) a mechanical connection that supports the device, e.g., substantially vertically, against a shearing force substantially perpendicular to the longitudinal axis of the hardware.

Beneficially, the device negates the need to unbolt the current license plate or license plate from the vehicle to install the temporary license plate. The device utilizes the already-installed hardware present on the vehicle.

In addition, the temporary license plate and license plate holder device can be removed from the vehicle by pulling the plate away from the vehicle in a direction parallel to the longitudinal axis of the existing license plate hardware.

In one aspect a temporary, magnetic license plate holder device is disclosed, comprising a license plate retention body having a connection head and a support arm attached to the head; and a cap removably connectable to the support arm, wherein the connection head includes a magnetic component and has a first end adapted to be magnetically connected to ferromagnetic hardware on a vehicle and a second end connected to a first end of the support arm, wherein the body has a longitudinal axis between a free, second end of the support arm and the first end of the connection head, wherein the first end has a cavity located within a perimeter of the first end, the cavity extending inwardly into the connection head, wherein the connection head has a maximum width that is greater than a maximum width of the support arm measured in a direction perpendicular to the longitudinal length of the body, wherein the cavity has a maximum width that is greater than the maximum width of the support arm, and wherein the magnetic component is one or more of i) a magnet located in the cavity and spaced a distance from the first end and ii) the connection head itself.

In a further embodiment, the cavity has a base and a side wall extending between the base and the first end of the connection head.

In still a further embodiment, the cavity is cylindrical.

In yet another embodiment, the cavity extends a length of about 50% to about 95% of the length of the connection head measured in relation to the longitudinal axis.

In a further embodiment, the magnet is present and connected to the base of the cavity, and wherein the space in the cavity between the magnet and the first end is adapted to accept at least a portion of the ferromagnetic hardware on the vehicle.

In still a further embodiment, the second end of the connection head connected to the support arm extends outwardly further than the support arm in a direction perpendicular to the longitudinal axis.

In yet another embodiment, the support arm is externally threaded.

In a further embodiment, the cap has a cavity that is internally threaded, wherein the cap threads mate with the support arm threads.

In still a further embodiment, the cap has a hexagonal outer surface.

In yet another embodiment, the cap has a knurled outer surface.

In a further embodiment, the entire body is magnetized.

In still a further embodiment, the cavity extends a length of about 60% to about 90% of the length of the connection head is measured along the longitudinal axis.

In yet another embodiment, the cavity has a depth about 2 to about 20 mm measured along the longitudinal access.

In a further embodiment, the depth is about 3 to about 15 mm.

In still a further embodiment, the support arm has a length of about 2 mm to about 22 mm, and wherein the diameter of the support arm is from about 2 mm to about 10 mm.

In yet another embodiment, the length of the support arm is about 5 mm to about 18 mm, wherein the diameter of the support arm is from about 7 mm to about 9 mm.

BRIEF DESCRIPTION OF THE DRAWINGS

The invention will be better understood and other features and advantages will become apparent by reading the detailed description of the invention, taken together with the drawings, wherein:

FIG. 5 is a side view of a further embodiment of an assembled license plate holder device of the present invention including a cap able to be manipulated by hand, a socket, wrench, or the like;

DETAILED DESCRIPTION OF THE INVENTION

Figure 1:
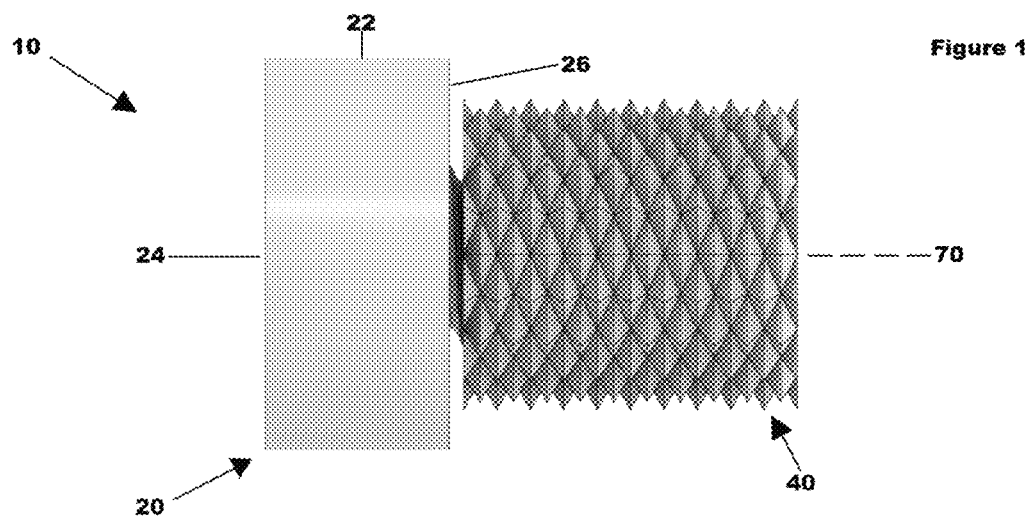
FIG. 1 is side view of one embodiment of an assembled license plate holder device of the present invention.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to the drawings wherein like parts are referenced by the same numbers throughout the several views, FIGS. 1-9 illustrate a license plate holder device 10 having a license plate retention body 20 operatively connected to a cap 40. Retention body 20 has a connection head 22 and support arm 30 attached to the connection head.

The connection head 22 has a first end 24 adapted to be magnetically connected to existing license plate holder hardware 60 such as a bolt or screw head, or other protrusion on a vehicle capable of forming a magnetic bond with the device 10, and a second end 26 connected to the support arm 30. The first end 24 has a cavity 28 located within a perimeter 50 of the connection head 20 at the first end 24, with the cavity 28 extending inwardly into the connection head 22 with respect to a longitudinal axis 70 of license plate holder device 10. The cavity 28 has a base 52 at a bottom at a bottom thereof, disposed adjacent support arm 10, generally opposite of the open end of the cavity located at first end 24. Cavity also has a side wall 54 extending from the base to the first end 24. Side wall 54 is shown being substantially parallel to longitudinal axis 70, but it is to be understood that other configurations can be utilized. For example, the cavity side wall 54 can be formed with one or more of protrusions and recesses which may further aid in temporarily securing the license plate holder 10 to hardware on a vehicle.

In one embodiment perimeter 50 is circular and cavity 28 is substantially cylindrical and preferably cylindrical. In still other embodiments, the cavity 28 can have a geometrical form with one or more angled side walls. For example, in one embodiment, the cavity walls can form a hexagon such that the connection head includes a hex socket. Still further, in various embodiments, the shape of the outer surface of the connection head is non-cylindrical and for example can flare inwardly or outwardly or even be in the form of a half cylinder that can provide contact with an upper surface of existing license plate holder hardware.

Figure 2:
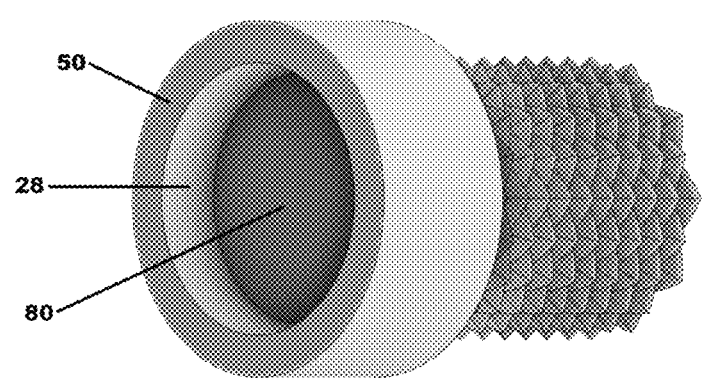
FIG. 2 is a perspective view thereof.
Figure 3:
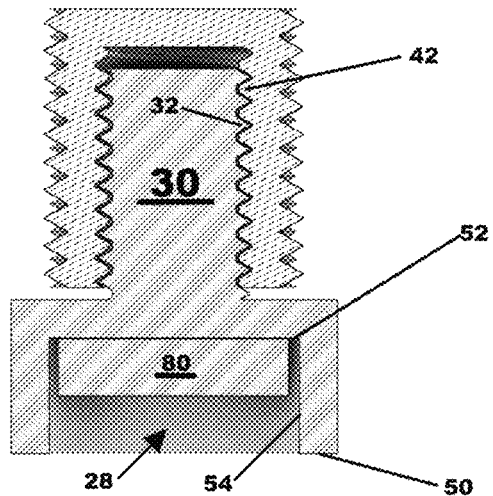
FIG. 3 is a cross-sectional side view thereof.
Figure 4:
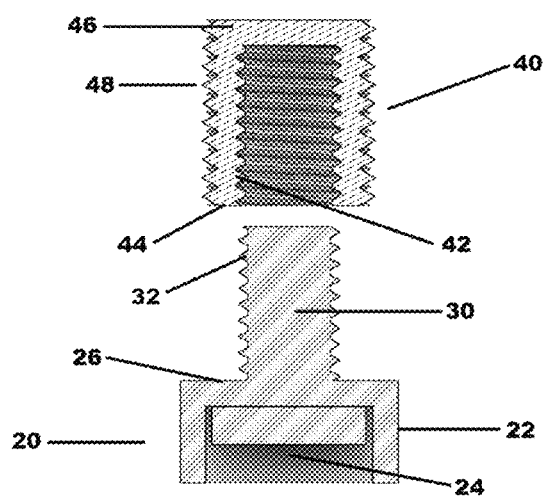
FIG. 4 is an exploded view thereof.
Figure 5:
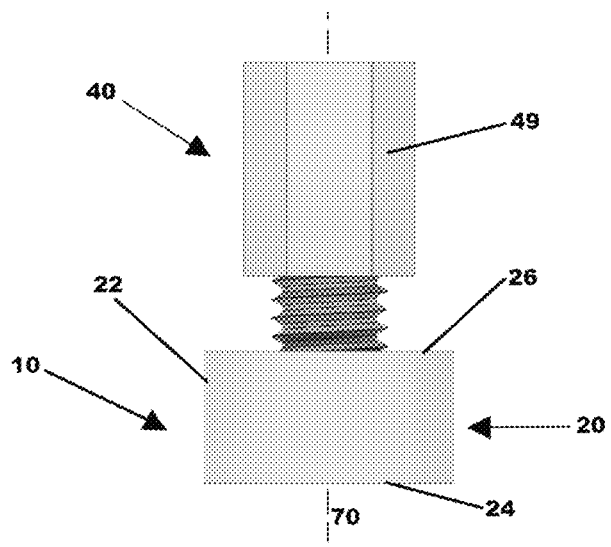
Figure 6:
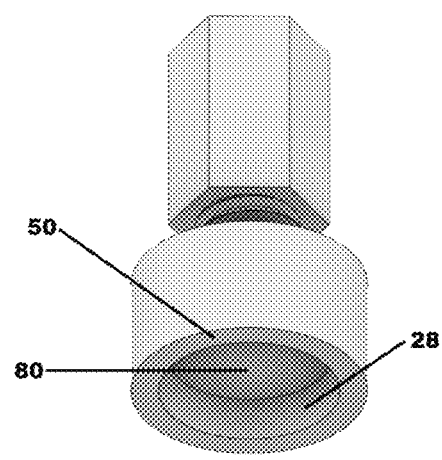
FIG. 6 is a perspective view.
Figure 7:
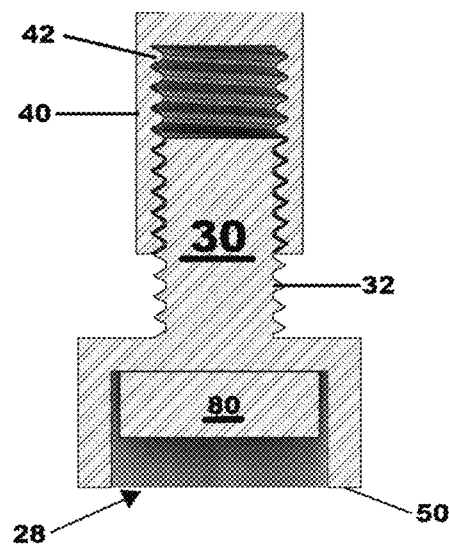
FIG. 7 is a cross-sectional side view thereof.
Figure 8:
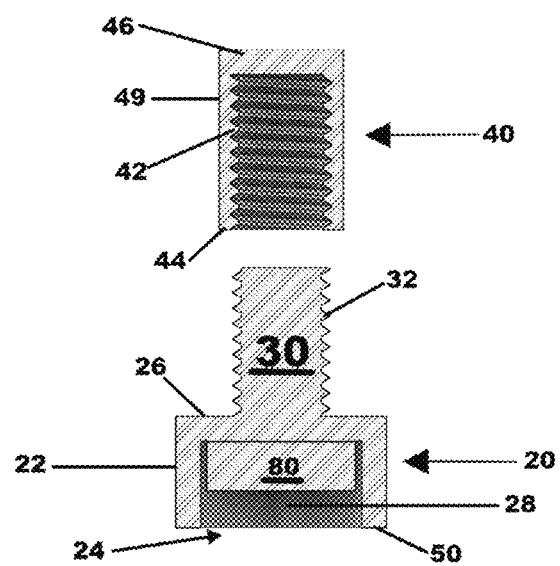
FIG. 8 is an exploded view thereof.
Figure 9:
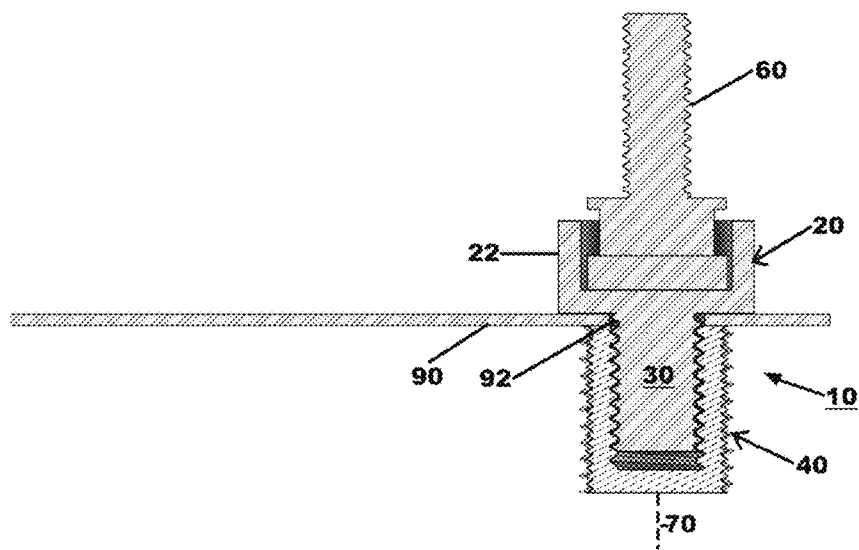
FIG. 9 is a cross-sectional side view of one embodiment of the license plate holder device having a license plate connected between a license plate retention body and cap, wherein a connection head of the retention body is shown magnetically connected to ferromagnetic hardware.

At least a portion of the connection head 20 is magnetic. In a preferred embodiment, the connection head 20 includes a magnet 80. As illustrated in FIGS. 2 and 3, magnet 80 is preferably connected to base 52 of cavity 28. Magnet 80 is oriented so that it attracts and is connectable to ferromagnetic hardware of the vehicle. While the magnet 80 illustrated is a disk magnet, any suitable magnet can be utilized and the form is not limited to the embodiments illustrated.

Cavity 28 has a depth in a longitudinal direction between the first end 24 and base 52 of the cavity or outer surface of magnet 80 that is sufficient to house at least part of an existing license plate holder hardware component. Depth of cavity 28 is generally about 2 to about 20 mm, desirably about 3 to about 15 mm and preferably about 4 to about 12 mm measured along the longitudinal axis.

The construction of connection head 20 provides for a two-part attachment mechanism for connecting the license plate holder device 10 to the vehicle. A magnetic connection is provided through magnet 80 or magnetization of the connection head 20 itself through the use of magnetic components within the connection head. The presence of cavity 28 also allows for a mechanical connection and physical contact between hardware of the existing license plate holder and a portion of the side wall 54 of the connection head. The physical contact supports against a shearing force substantially perpendicular to the longitudinal axis 70 of the magnetic license plate holder device 10 and/or the hardware of the license plate holder of the vehicle.

The thickness of the side wall between the inner surface of the cavity and the outer surface of the connection head is variable.

The support arm 30 is connected to connection head 20 as illustrated in the drawings. The connection head 20 and support arm 30 can be formed as an integral, single component or be connected through any suitable means such as another fastener, adhesive or the like. Preferably the connection head 20 and support arm 30 are integrally formed. Support arm 30 preferably extends along the longitudinal axis of the device 10 a sufficient distance to allow cap 40 to secure a license plate to device 10.

Support arm 30 preferably includes threads 32 which are mateably threadable with threads 42 of cap 40. The length of support arm 30 ranges generally from about 2 mm to about 22 mm, desirably from about 5 mm to about 18 mm and preferably from about 8 mm to about 14 mm. Support arm 30 has a shank that is of a sufficient diameter in order to be inserted into an aperture in a license plate to be connected to the license plate holder device 10. That said, the diameter of the support arm 30 generally ranges from about 2 mm to about 10 mm and preferably from about 7 mm to about 9 mm.

Cap 40 has a first, open end 44 and a second end 46, which is preferably closed. Second end 46 may comprise an aperture in some embodiments. When the second end 46 comprises an aperture, cap 40 possesses a through-bore extending between the first end 44 and second and 46. As noted hereinabove, threads 42 on the internal surface of cap 40 mate with threads 32 of support arm 30. Cap 40 has a diameter sufficiently large such that the outer edge of the cap, measured in a direction perpendicular to the longitudinal axis 70, do not allow the cap to be passed through an aperture of the license plate. Accordingly, at least some of the solid portion of first end 44 contacts a surface of the license plate adjacent to aperture thereof.

The outer side wall surface 48 of cap 40 in the embodiment illustrated in FIGS. 1-4 has a surface that is easily manipulated by a user. A knurled surface is illustrated in FIGS. 1-4. The embodiment illustrated in FIGS. 5-8 includes a cap 40 having a hexagonal outer surface 49 which can be manipulated by a wrench, socket or the like, as well as by hand.

In one embodiment, to utilize device 10, support arm 30 is passed through an aperture 92 in the license plate 90 to be connected to the device 10. Cap 40 is screwed onto support arm 30, a sufficient distance in order to capture the license plate between second end 26 of connection head 20 and first end 44 of cap 40. Thereafter, magnet 80 or magnetized portion of connection head 20 is brought into contact with hardware 60 of the existing license plate holder that is magnetically attractable to the device magnet 80 or magnetized portion of the connection head 20, whereby the device and hardware 60 are temporarily connected. The recess in the connection head, namely cavity 28, contacts a side wall surface of the hardware to provide generally vertical support against any shearing force that may be encountered as the vehicle is utilized on a roadway. When the temporary plate needs to be removed from the vehicle, it is easily disconnected by pulling the plate away from the vehicle by overcoming the magnetic force between the hardware and the license plate holder device.

For the avoidance of doubt, the devices and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A temporary, magnetic license plate holder device, comprising:
    a license plate retention body having a connection head and a support arm attached to the head; and
    a cap removably connectable to the support arm,
    wherein the connection head includes a magnetic component and has a first end adapted to be magnetically connected to ferromagnetic hardware on a vehicle and a second end connected to a first end of the support arm,
    wherein the body has a longitudinal axis between a free, second end of the support arm and the first end of the connection head,
    wherein the first end has a cavity located within a perimeter of the first end, the cavity extending inwardly into the connection head, wherein the connection head has a maximum width that is greater than a maximum width of the support arm measured in a direction perpendicular to the longitudinal length of the body, wherein the cavity has a maximum width that is greater than the maximum width of the support arm, and wherein the magnetic component is one or more of i) a magnet located in the cavity and spaced a distance from the first end and ii) the connection head itself.

2. The device according to claim 1, wherein the cavity has a base and a side wall extending between the base and the first end of the connection head.

3. The device according to claim 2, when the cavity is cylindrical.

4. The device according to claim 3, wherein the cavity extends a length of about 50% to about 95% of the length of the connection head measured in relation to the longitudinal axis.

5. The device according to claim 4, wherein the magnet is present and connected to the base of the cavity, and wherein the space in the cavity between the magnet and the first end is adapted to accept at least a portion of the ferromagnetic hardware on the vehicle.

6. The device according to claim 5, wherein the second end of the connection head connected to the support arm extends outwardly further than the support arm in a direction perpendicular to the longitudinal axis.

7. The device according to claim 6, wherein the support arm is externally threaded.

8. The device according to claim 7, wherein the cap has a cavity that is internally threaded, wherein the cap threads mate with the support arm threads.

9. The device according to claim 8, wherein the cap has a hexagonal outer surface.

10. The device according to claim 8, wherein the cap has a knurled outer surface.

11. The device according to claim 4, the cavity extends a length of about 60% to about 90% of the length of the connection head as measured along the longitudinal axis.

12. The device according to claim 1, wherein the cavity has a depth about 2 to about 20 mm measured along the longitudinal access.

13. The device according to claim 12, wherein the depth is about 3 to about 15 mm.

14. The device according to claim 1, wherein the support arm has a length of about 2 mm to about 22 mm, and wherein the diameter of the support arm is from about 2 mm to about 10 mm.

15. The device according to claim 14, wherein the length of the support arm is about 5 mm to about 18 mm, wherein the diameter of the support arm is from about 7 mm to about 9 mm.

16. A temporary, magnetic license plate holder device, comprising:
a license plate retention body having a connection head and a support arm attached to the head; and
a cap removably connectable to the support arm,
wherein the connection head includes a magnetic component and has a first end adapted to be magnetically connected to ferromagnetic hardware on a vehicle and a second end connected to a first end of the support arm,
wherein the body has a longitudinal axis between a free, second end of the support arm and the first end of the connection head,
wherein the first end has a cavity located within a perimeter of the first end, the cavity extending inwardly into the connection head,
wherein the connection head has a maximum width that is greater than a maximum width of the support arm measured in a direction perpendicular to the longitudinal length of the body,
wherein the cavity has a maximum width that is greater than the maximum width of the support arm, and
wherein the magnetic component is one or more of i) a magnet located in the cavity and spaced a distance from the first end and ii) the connection head itself, and
wherein the entire body is magnetized.

17. A temporary, magnetic license plate holder device, comprising:
a license plate retention body having a connection head and a support arm attached to the head; and
a cap removably connectable to the support arm,
wherein the connection head includes a magnetic component and has a first end adapted to be magnetically connected to ferromagnetic hardware on a vehicle and a second end connected to a first end of the support arm,
wherein the body has a longitudinal axis between a free, second end of the support arm and the first end of the connection head,
wherein the first end has a cavity located within a perimeter of the first end, the cavity extending inwardly into the connection head,
wherein the connection head has a maximum width that is greater than a maximum width of the support arm measured in a direction perpendicular to the longitudinal length of the body,
wherein the cavity has a maximum width that is greater than or equal to a maximum width of the cap, and
wherein the magnetic component is one or more of i) a magnet located in the cavity and spaced a distance from the first end and ii) the connection head itself.

18. The device according to claim 17, when the cavity is cylindrical, wherein the magnet is present and connected to the base of the cavity, and wherein the space in the cavity between the magnet and the first end is adapted to accept at least a portion of the ferromagnetic hardware on the vehicle.

19. The device according to claim 17, wherein the support arm is externally threaded, wherein the cap has a cavity that is internally threaded, and wherein the cap threads mate with the support arm threads.

20. The device according to claim 17, wherein the cavity extends a length of about 60% to about 90% of the length of the connection head as measured along the longitudinal axis and wherein the cavity has a depth about 2 to about 20 mm measured along the longitudinal access.

* * * * *